United States Patent [19]

Johnson

[11] Patent Number: 4,687,064

[45] Date of Patent: Aug. 18, 1987

[54] GREEN PEANUT HARVESTER

[75] Inventor: Reaves Johnson, Smithville, Ga.

[73] Assignee: RJM, Inc., Ocala, Fla.

[21] Appl. No.: 843,133

[22] Filed: Mar. 24, 1986

[51] Int. Cl.⁴ .............. A01D 29/00; A01D 46/00; A23N 15/02

[52] U.S. Cl. .................................. 171/27; 171/61; 56/330; 99/638; 130/30 C

[58] Field of Search ............ 171/13, 17, 21, 26, 171/27, 61, 62, 36, 41; 130/30 C, 30 H, 30 J, 30 R; 56/16.5, 330, 327 R; 99/638

[56] References Cited

U.S. PATENT DOCUMENTS

| | | | |
|---|---|---|---|
| 944,945 | 12/1909 | Calkins | 171/27 |
| 3,059,703 | 10/1962 | Pearman | 171/61 |
| 3,181,617 | 5/1965 | Wallace | 171/61 |
| 3,613,797 | 10/1971 | Whitfield et al. | 171/61 |
| 4,037,666 | 7/1977 | Rath | 171/61 |
| 4,286,426 | 9/1981 | Orlando et al. | 56/330 |
| 4,607,703 | 8/1986 | Wang | 171/61 X |

FOREIGN PATENT DOCUMENTS

| | | | |
|---|---|---|---|
| 28887 | 11/1921 | Denmark | 171/61 |
| 125810 | 5/1900 | Fed. Rep. of Germany | 171/21 |
| 1228845 | 11/1966 | Fed. Rep. of Germany | 130/30 C |
| 1815097 | 6/1970 | Fed. Rep. of Germany | 171/61 |
| 102722 | 10/1941 | Sweden | 171/61 |

OTHER PUBLICATIONS

Mills, William T., "New Method of Harvesting Virginia Bunch Peanuts," Transactions of the American Society of Agricultural Engineers (ASAE), vol. 4, No. 1, pp. 26–30 (1961).

Primary Examiner—Robert E. Bagwill
Assistant Examiner—Terrence L. B. Brown
Attorney, Agent, or Firm—Macdonald J. Wiggins

[57] ABSTRACT

A harvester for harvesting green peanuts is moved along a peanut bed. A plant conveyor using an angled pair of back-to-back V-belts is arranged to cause the belts to grip the stem area of peanut plants and, as the belts move rearward and the harvester moves forward, the plants are pulled from the bed. Picking elements having a plurality of toothed picking combs move laterally beneath the belts, contacting the plant root structure and removing the peanuts therefrom. Means are provided for removing dirt from the roots, transporting picked peanuts to a storage bin and storing the peanuts therein.

16 Claims, 10 Drawing Figures

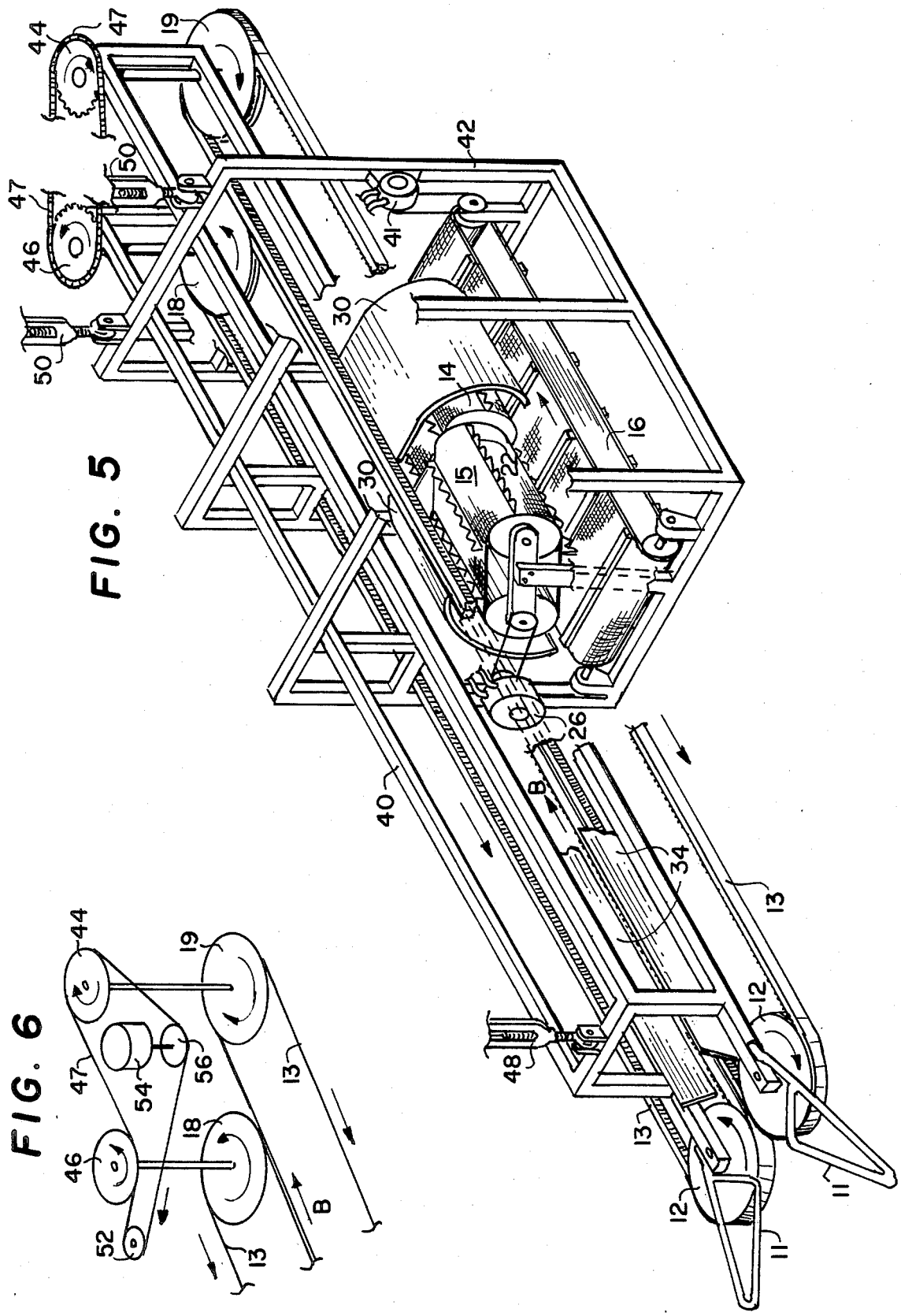

GREEN PEANUT HARVESTER

BACKGROUND OF THE INVENTION

1. Field of the Invention

The present invention relates to peanut harvesters and more particularly to a harvester for digging peanut vines and removing the green peanuts from the vine in a single apparatus.

2. Description of the Prior Art

Mechanical harvesting of peanuts has been primarily limited in the past to use of machines which dig the peanut vines and deposit the picked vines back on the row, generally inverted. The peanuts are permitted to dry out, gathered, and later removed from the dried vines by mechanical pickers. However, this approach requires two passes over the field and is not suitable for green peanuts. Green peanuts are found to be much more difficult to separate from the vines and generally manual labor has been used for this purpose.

There have been a number of peanut combines proposed in the prior art and described in the following U.S. Patents:

U.S. Pat. No. 2,788,628, Philips, Jr.
U.S. Pat. No. 2,522,644, Searcy
U.S. Pat. No. 3,053,034, Harrington et al
U.S. Pat. No. 3,404,517, Whitfield et al
U.S. Pat. No. 3,775,953, Poutsma In general, these machines are very complex and none are known to have come into general use. A 1961 article entitled "New Method of Harvesting Virginia Bunch Peanuts" by William T. Mills appeared in the Transactions of the ASAE (Vol. 4, No. 1, Pages 26, 27 and 30, 1961), St. Joseph, Mich. This paper described the progress in a machine and method using a plant conveyer belt disposed at an angle which picks up a peanut plant and carries it upward to a point where a pair of cylinders having curved blades mounted thereon separate the peanuts by knocking them loose from the vine roots. Means are also described for removing leaves and dirt from the picked peanuts. Although this article appeared over 20 years ago, the harvesting of green peanuts in the southern part of the United States appears to be still done manually.

The price that can be obtained for green peanuts is closely related to the cleanliness of the peanuts and the freedom from bruising or other damage to the peanuts. The present invention is capable of delivering picked peanuts directly from the field and which are very clean and free from dirt, leaves, and other debris. The stems may then be removed in the apparatus described in my U.S. Pat. No. 4,542,687 which discloses a green peanut destemmer and washer. After destemming, the peanuts may be washed and automatically packed in hampers. Such peanuts are exceptionally clean and undamaged and claim a higher price in the market place than manually picked and washed green peanuts.

SUMMARY OF THE INVENTION

My invention utilizes a plant conveyor belt mounted on a vehicle or vehicle chassis. A pair of rubber V-belts is positioned back-to-back to move rearward and upward and is synchronized with the vehicle driving system to have a rearward velocity component exactly equal to the forward velocity of the vehicle. The V-belts are mounted on suitable pulleys and driven preferably by a hydraulic motor drive system such that the back-to-back V-belts are both moving rearwardly at the same velocity. The plant conveyor belt is disposed such that the forward end is just above the level of a peanut bed having peanut plants to be harvested. A pair of V-shaped rods is disposed forward of the belts for guiding the stem portions of a peanut plant into and between the conveyor belts. Therefore, as the vehicle moves forward, the V-belts grasp the plant stems between the belt faces and move the plants rearward. As the vehicle moves forward, the resulting force on the plant is directly upward which pulls the root structure from the bed.

The plant conveyor belts carry the harvested plants rearward and upward to cause the roots of the plants containing the peanuts to pass over a pair of picking elements. Each picking element includes a flat belt disposed over a pair of belt drums, one of said drums being driven to move the top surface of the belt transverse to the plant conveyor belt and just below the conveyor belt. A plurality of toothed picking combs is mounted transversely to the flat belts such that the combs move across the plants for contacting the roots and stripping the peanuts therefrom. Advantageously, I provide a pair of such picking elements with the second picking element having its belt moving in the opposite direction from the first picking element. This ensures almost 100% of the peanuts being picked.

The picked peanuts fall to a longitudinally disposed chain link belt which carries the picked peanuts to a transverse conveyor belt. This belt further transports the picked peanuts to additional conveyors which deposit the peanuts in a storage bin mounted on the vehicle.

In addition to the harvesting and picking system of my invention, I provide blower and shaker means for removing dirt and debris from the picked peanuts such that the stored peanuts are relatively clean.

It is therefore a principal object of my invention to provide a green peanut harvester which will move along a row of peanuts, will remove the peanut plants from the beds, carry the roots of the plants across a pair of picking elements which then separate the peanuts from the plant roots.

It is another object of my invention to provide a green peanut harvester which will strip the peanuts from the peanut plant roots by means of toothed combs without bruising or other damage to the peanuts.

It is still another object of my invention to provide a green peanut harvester in which means is provided to remove dirt and debris from the picked peanuts resulting in relatively clean picked green peanuts.

These and other objects and advantages of my invention will become apparent from the following detailed description when read in conjunction with the drawings.

BRIEF DESCRIPTION OF THE DRAWINGS

FIG. 5 is a partially cut away perspective view of the harvesting and picking elements of the invention in a mounting frame;

FIG. 6 is a schematic diagram of the plant conveyor belt drive system for FIG. 5;

DETAILED DESCRIPTION OF THE PREFERRED EMBODIMENT

Figure 1:
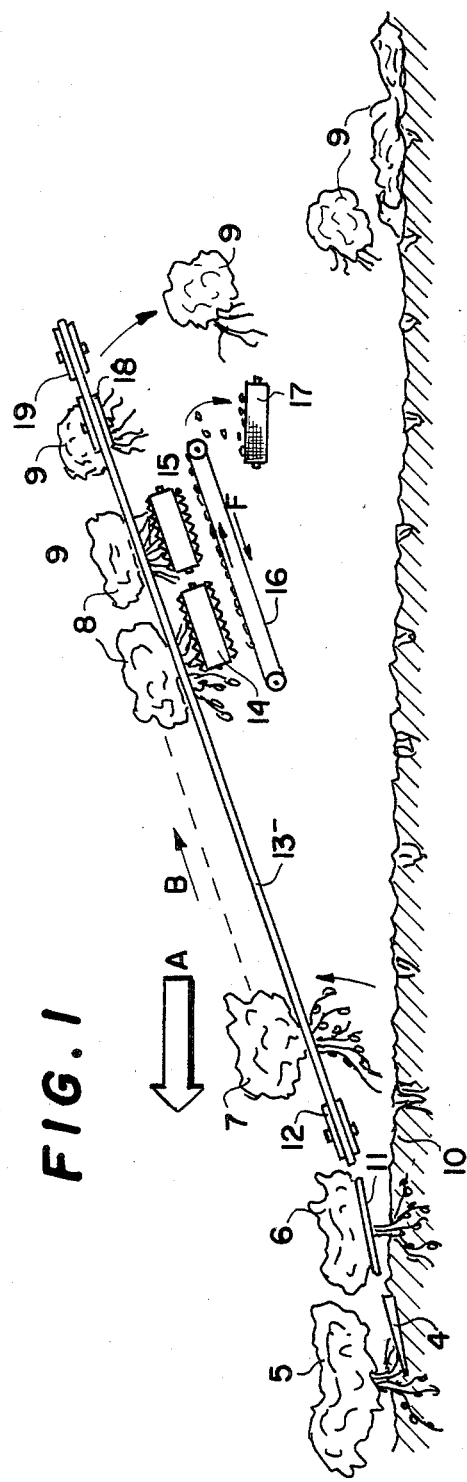
FIGS. 1 and 2 present schematic diagrams of the green peanut harvester of the invention in operation with FIG. 1 presenting a side view in which supporting structures are omitted for clarity and FIG. 2 presenting a top view in which supporting structures are omitted for clarity.
Figure 2:
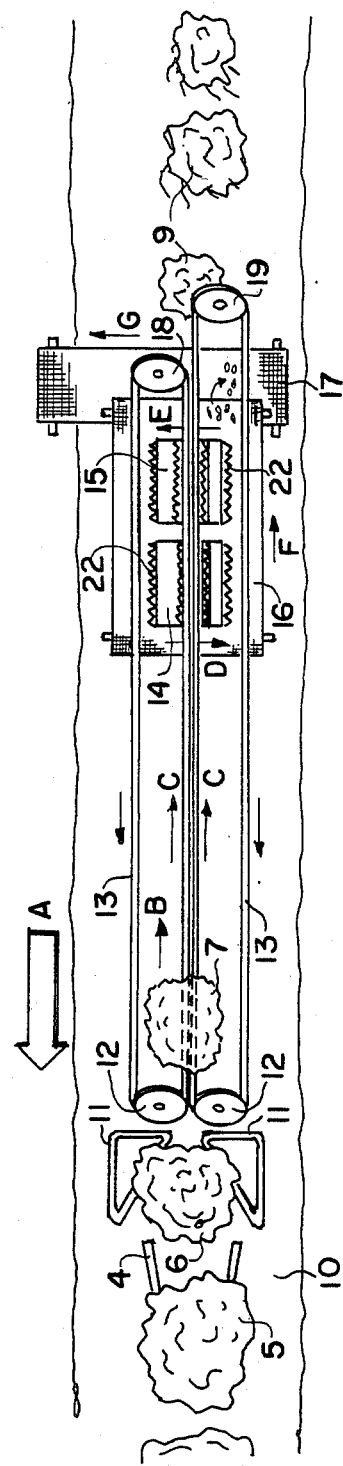

Referring to FIGS. 1 and 2 of the drawings, schematic diagrams, in side and top view, of the operative elements of my invention are shown with all supporting and driving structure omitted for clarity. Plant conveyor belts 13 are supported at the forward end of the apparatus by pulleys 12 such that the belts 13 are back to back along a centerline thereof and driven by pulleys 18 and 19 at the rearward end.

Belts 13 are preferably rubber V-type having toothed inner edges to provide traction. Pulleys 18 and 19 are driven as shown hereinafter to counter rotate so as to cause the centerline belt portions to move rearward as shown by arrows C. As seen in FIG. 1, plant conveyor belts 13 are disposed at an angle with respect to peanut bed 10 having plants 5 and 6 growing therein such that the centerline belt portions move rearward and upward as shown by arrows C. The apparatus is moving forward along bed 10 as indicated by solid arrow A at a velocity equal to the horizontal component of the rearward velocity of belts 13.

As the plant conveyor belts 13 are moved forward by the vehicle, the stem area of peanut plant 6 is being guided by a set of angular guide bars 11 into the centerline of belts 13 and the stems are caught between the two belts as shown in FIG. 2. For example, the stems of peanut plant 7 has been caught by belts 13 and moved rearwardly with respect to the apparatus. However, due to the forward movement indicated by arrow A and the rearward movement of the belts 13 as indicated by arrows C, and the synchronization of the belt speed with the forward speed previously mentioned, the plant has been pulled essentially vertically from the ground as seen in FIG. 1. At this point, the leafy portion of plant 7 is seen to be above the belts 13 while the root structure having the peanuts depending therefrom is below belts 13.

Plants 7 are carried up conveyor belt 13 as indicated by arrow B until they reach picking elements 14 and 15. As will be described in more detail hereinafter, picking elements 14 and 15 each have a flexible flat belt with a plurality of toothed elements 22 attached thereto. These picking belts are moving in opposite directions as indicated by arrows D and E in FIG. 2. Thus, the surface of the belts are moving in horizontal planes transverse to the conveyor belts 13. As a toothed element 22 moves past the roots of plants 8, the teeth thereof contact the root structure and tend to strip the peanuts therefrom without bruising or damaging the peanuts. The stripped peanuts drop to a conveyor belt 16, preferably formed from chain link material, which carries the picked peanuts in the direction as indicated by arrow F depositing the peanuts onto a transverse conveyor 17 for subsequent collection.

The combination of the oppositely moving belts of picking elements 14 and 15 has been proven to remove almost all of the peanuts from the plants 8. As the picked plants 9 continue they will drop off belts 13 and be deposited back on bed 3. As may be noted, conveyor 17 is moving in the direction as indicated by arrow G to a collection system to be later shown for transport to a storage bin.

Figure 3:
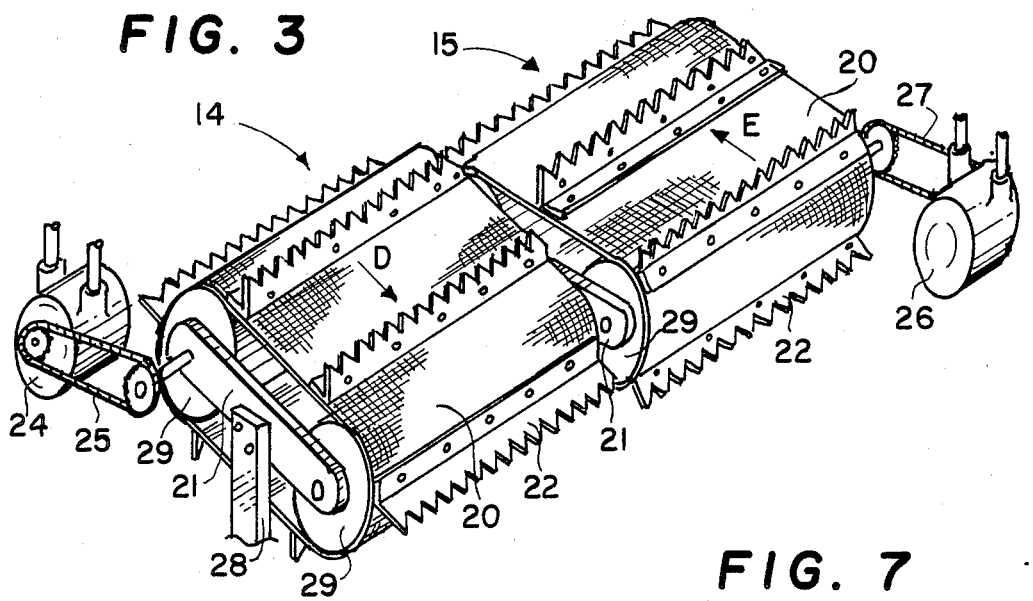
FIG. 3 is a perspective view of the picking elements of the invention.

Turning now to FIG. 3, details of picking elements 14 and 15 are disclosed. Belt 20 of element 14 is supported on a pair of drums 29 which are supported by bracket 21 attached to bracket 28 shown in partial view. One drum 29 is coupled by a chain and sprocket drive 25 to a hydraulic motor 24. Although any type of drive system may be used, I prefer hydraulic motor 24 since it can be easily regulated to provide the desired rotational speed of drums 29. I have found that a speed of about 300 rpm is satisfactory. Mounted in a spaced relationship around belt 21 is a plurality of toothed comb picking elements 22. Elements 22 may be formed from metal or preferably a slightly resilient plastic material. Belt 20 moves in the direction indicated by arrow D while the complementary belt 20 of picking element 15 moves in the opposite direction as indicated by arrow E. Otherwise, the picking elements 14 and 15 are identical. Picking element 15 is driven by hydraulic motor 26 via a belt and sprocket system 27.

Figure 4:
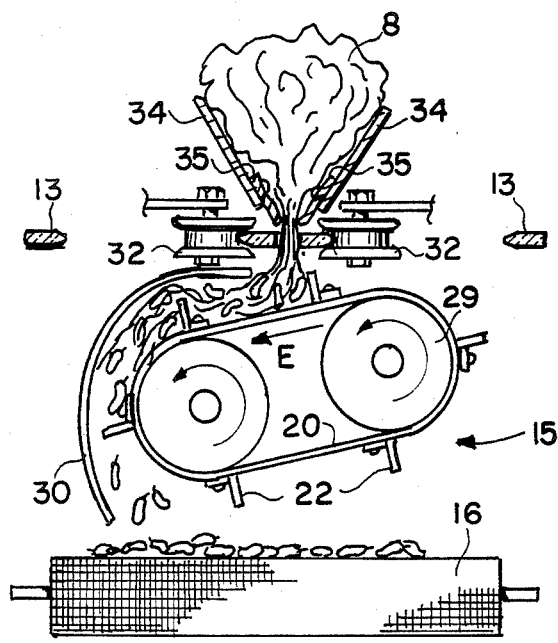
FIG. 4 is a cross-sectional view through the plant conveyor belts and a picking element showing the peanut separation action of the invention.
Figure 7:
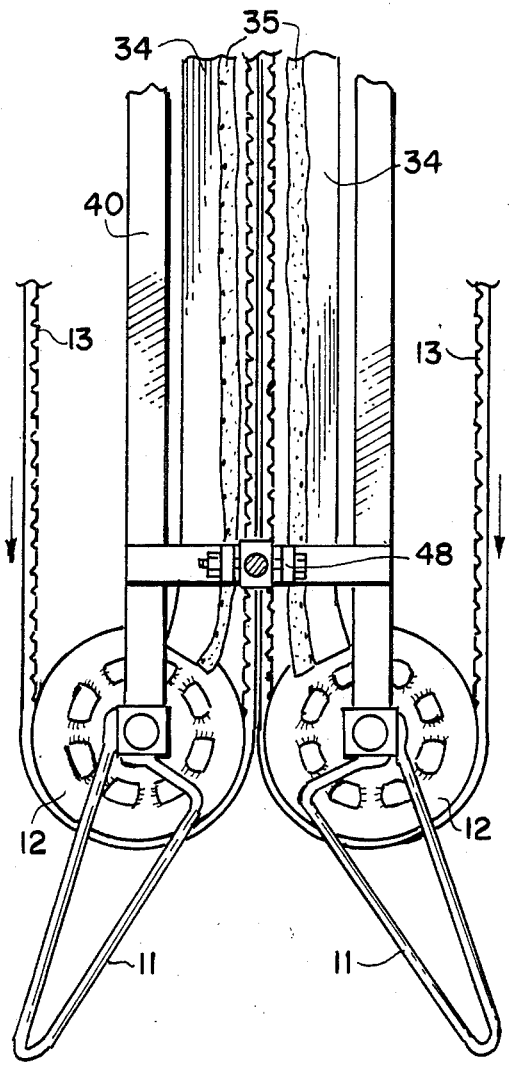
FIG. 7 is a top view of the forward end of the plant conveyor belt assembly.

The operation of the picking elements 14 and 15 is best understood with reference to FIG. 4 which is a lateral cross-sectional view through conveyor belts 13 and picking element 15. The inner surfaces of V-belts 13 are maintained in close contact with each other by means of a plurality of tension rollers 32 disposed along the entire run of belts 13. In FIG. 4, plant 8 is seen to be tightly gripped between the two belts 13 at its stalk area. To minimize leaves and the like of plant 8 from being mixed with the picked peanuts, I provide a V-shaped guide channel formed by a pair of guide plates 34 along belts 13. As will be noted, the leafy portion of plant 8 is isolated from the conveyor belts 13. At the lower edges of guide plates 34, I also attach a pair of flexible strips 45 along the lower edges of guides 34. Strips 45 may be formed from rubber, leather type material, or other suitable material to prevent the edges of guides 34 from breaking or cutting the stem portion of plants A. A metal shield 30 is disposed as shown covering the picking area of belt 20. As belt 20 rotates in the direction indicated by arrow E, the roots of plant 8 are forced to the left and upward towards shield 30. As a toothed picking element 22 passes through the root structure, the roots are caught in the grooves therein and, through the combination of the velocity of belt 20 and the movement of plant 8 therealong the surface of belt E, practically all of the peanuts attached to the roof contact picking elements 22 are pulled from the roots. The motion of belt 20 is in the direction to strip the peanuts from the root structure toward shield 30. The picked peanuts are then guided by shield 30 downward to be collected on conveyor 16. It will be noted from FIG. 3 and FIG. 4 that the picking element 14 is disposed such that the plane in which the axis of drum 29 lies is at an angle with the plane of belts 13. The other picking element 14 is also angled but with the opposite angle from picking element 15.

Advantageously, the use of the two belts 20 of picking elements 14 and 15 moving in opposite directions will permit any peanuts missed by the first belt due to the roots being forced, for example, to the left as in FIG. 4, to have a very high probability of being picked when the plant enters the second picking element which causes the roots to be pushed to the opposite side. Peanuts which may have been previously missed will then come in contact with the second set of toothed picking bars 22 and be separated thereby from the roots.

Details of a preferred mechanical construction for the conveyor belt 13 and the picking elements 14 and 15 are shown in FIG. 5. I provide a framework 40 which may be fabricated from square steel tubing or the like. It is to be understood that additional bracing for framework 40 has been omitted from FIG. 5 for clarity. Frame 40 includes a pair of forwardly projecting portions 41 which support belt pulleys 12 and guide rods 11. At the rear end of framework 40, I mount the drive system for pulleys 18 and 19 which includes sprockets 44 and 46 and chain 47. A second framework 42 is attached to framework 40 for supporting picking elements 14 and 15 and conveyor belt 16. Framework 42 has been partially cut away to provide a view of the picking elements 14 and 15 and conveyor 16. It is also to be understood that additional bracing which has been omitted for clarity is provided for framework 42.

As will be noted, belts 13 are preferably toothed V-belts of rubber or similar composition material. Spring loaded tension rollers 32 shown in FIG. 4 have also been omitted from FIG. 5 for clarity. Such rollers are disposed along the entire length of belts 13 to cause belts 13 to maintain a tight grip on the stalk of peanut plants during operation of the apparatus. As will be seen, picking element 15 and its shield 30 are supported below belts 13 by frame 42, although details of the mounting structure which will be obvious to those of skill in the art are omitted for clarity. Picking element 14 is disposed immediately to the rear of element 15 and the angular displacement of element 14 with respect to element 15 may be noted. Conveyor belt 16 which moves in the direction indicated by arrow F is preferably formed from chain link such that dirt and other debris may fall through the conveyor to the ground. I prefer to drive conveyor belt 16 with a hydraulic drive motor 14 attached to framework 42.

Frames 40 and 42 are suspended in a vehicle to be described hereinafter by adjustable supports 48 and 50. If desired, hydraulic elements may be included in the supports to permit vertical adjustments to be made by operating hydraulic controls. Alternatively, mechanical supports such as turnbuckles may be used and adjusted manually for desired ground clearance.

A schematic diagram of the drive system for belts 13 is shown in FIG. 6. As will be noted, drive pulleys 18 and 19 are coupled to sprockets 44 and 46 driven from hydraulic motor 54 via sprocket 56 and idler sprocket 52. Drive chain 47 is driven in the direction shown by the arrow and is coupled to sprockets 46 and 44 as shown in order to turn these sprockets in opposite directions thereby causing the center sections of both belts 13 to move in the same direction as indicated by arrow B. As previously mentioned, the speed of hydraulic drive motor 54 is controlled to match the velocity of the rearward component of belts 13 with the forward speed of the vehicle.

When the stalk of a peanut plant is guided into the counter-rotating pulleys 12, it is caught by the belts 13 and the leafy portion is guided between the guide plates 34 which prevents a bushy plant structure from contacting bracing and other portions of framework 40 or from falling below the belts 13 as it moves rearward which could produce additional trash and debris.

Figure 8:
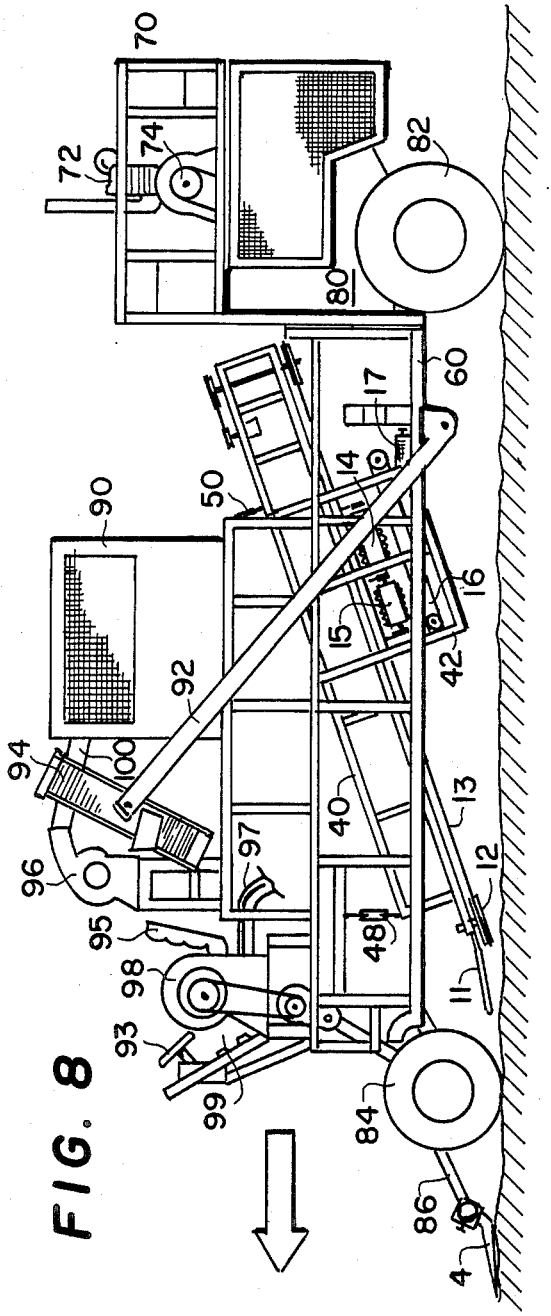
FIG. 8 is a side view of a vehicle having the conveying and picking elements of the invention installed thereon.

In FIG. 8, I show a simplified side view of a vehicle having my novel green peanut harvester installed thereon. A chassis and framework 60 is provided having a pair of steerable wheels 84 attached at the front end thereof and a motor and drive support section 70 attached at the rear end. An engine 72, preferably a diesel engine, is mounted in power section 70 and coupled via a drive system 74 to rear drive wheels 82. An operator's seat 95 is provided at the front end of the vehicle having a steering wheel 93 and engine controls 99 for operation of engine 72. Also installed in compartment 80 are hydraulic pumps and reservoir for operation of the various hydraulic motors of my intention. At the front end of the vehicle, I provide an attachment bar 86 to which various accessories can be attached. For example, a set of plow bars 4 is shown attached which is useful for breaking the soil ahead of plant conveyor belts 13 such that the plants are easily removed from the bed.

Framework 40 and 42 are suspended by suspension devices 48 and 50 from the chassis and frame 60 as indicated. This permits the adjustment of the height of the front end of conveyor belts 13 as required. A peanut storage bin 90 is mounted on top of chassis and frame 60 for collecting the picked peanuts. A series of conveyors is utilized to transport the picked nuts into the storage bin 90. Conveyor 16 carries the picked nuts to transverse conveyor 17 which deposits the peanuts onto conveyor 92 which carries the peanuts to conveyor 94. Conveyor 94 deposits the peanuts in a chute 100 for guiding the peanuts into storage bin 90. A blower 96 may be used and connected to chute 100 to urge the peanuts into storage bin 90.

A large blower 98 may be mounted on framework 60 and air ducts 97 connected to air outlets for assisting in removal of dirt, leaves and other debris.

Figure 10:
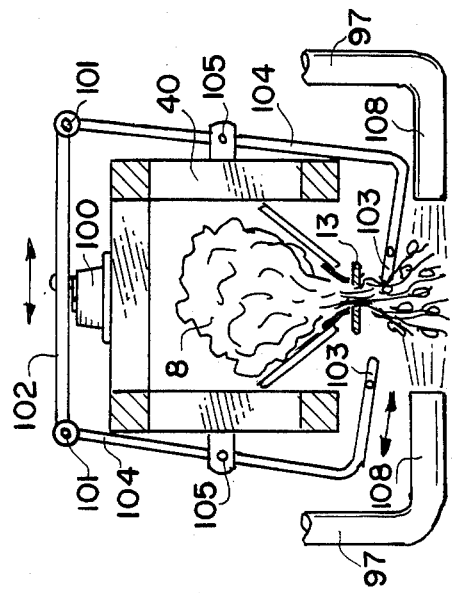
FIG. 10 is a cross-sectional view of a frame of the harvester showing details of the shaker of FIG. 9.
Figure 9:
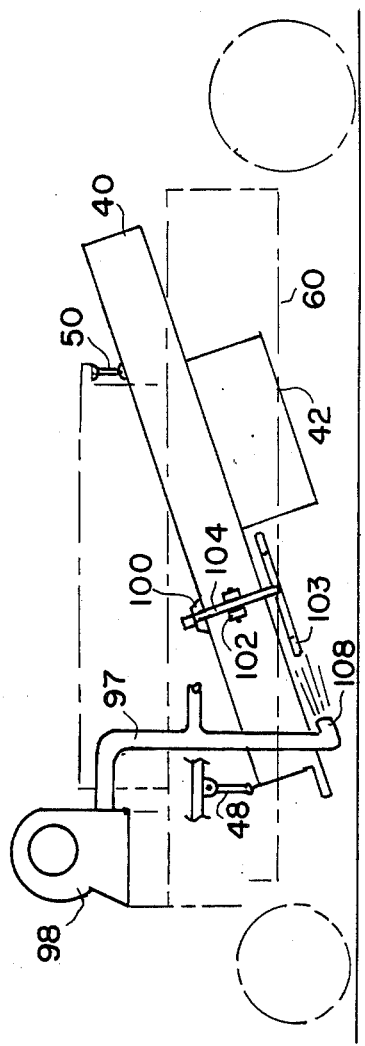
FIG. 9 is a schematic diagram of a blower and shaker system for the harvester to remove dirt, leaves and debris.

Turning now to FIGS. 9 and 10, a schematic representation of additional means I have provided for ensuring the cleanliness of the picked peanuts is shown. In FIG. 9, framework 40 and 42 are indicated in chassis framework 60 being suspended therefrom by links 48 and 50. A set of ducts 97 is represented having outlets 108 disposed below framework 40 and adjacent to the path of the root structure of harvested peanut vines. Thus, the air flow from outlets 108 will strike the root structures of the plants and will assist in removing the dirt therefrom.

However, to even more completely remove the dirt from the plant roots, I provide a shaking system by mounting a hydraulic motor 100 to framework 60 and an eccentric link 104 and 102 connected to framework 40. As best seen in FIG. 10, eccentric link 102 is pivoted by bearings 101 to operating rods 104 which in turn are supported by pivot bearings 105. As will be recognized, rods 104 will oscillate as indicated by the arrows in FIG. 10. A pair of striker rods 103 connected to the distal ends of rods 104 and essentially parallel to belts 13 are thus caused to strike the root structure of peanut plants 8 as it moves upwards by means of conveyor belt 13 loosening the dirt which may be clinging thereto and permitting the air blast from ports 108 to thereby remove dirt which otherwise might be carried on through the picking system. Although not shown, I provide small blower assemblies at other points in the peanut conveyor systems; for example, at the lower end of conveyor 92 and 94. As a result, the peanuts deposited in storage bin 90 are relatively clean and free from leaves and dirt except for soil clinging to the peanuts which will be subsequently removed in a destemming and washing operation.

I have described my invention with reference to a preferred embodiment as discussed in detail above. However, it will be obvious that various changes and different arrangements of the operative elements of my invention may be made without departing from the spirit and scope of my invention. In another embodiment of my invention, I prefer to mount two of the frameworks 40 and associated plant conveyor and picking elements side by side in a single vehicle which permits harvesting of the peanuts from two rows simultaneously. This concept may be extended to apparatus which will cover more than two rows at a time.

My invention may also be implemented by mounting the operative elements on a trailer-like vehicle and a tractor with power takeoff utilized to move the trailer over the peanut beds and to power the various drive motors. Although I have disclosed the use of hydraulic drive motors for the various elements of my invention, it is clear that electrical motors and pneumatic motors may be substituted. These and other changes are considered to fall within the scope of my invention.

I claim:

1. A harvester having harvesting means for unearthing green peanut plants from a peanut bed and having means for picking green peanuts from a root structure of said plants; said harvester having a longitudinally disposed continuous conveyor belt having a pair of opposed belts for carrying unearthed peanut plants;
   said means for picking peanuts being disposed below and adjacent a rearward end of said conveyor belt for picking peanuts from a root structure of such unearthed plants, said picking means having:
   (i) first and second picking elements disposed in tandem relationship, said first element having a flat belt moving in a first direction transverse to said conveyor belt and said second element having a flat belt moving in the opposite transverse direction,
   (ii) each of said flat belts disposed on a pair of rotatable drums having parallel axes,
   (iii) each of said flat belts having a plurality of saw-tooth like picking combs attached to the surface thereof, and
   (iv) a shield disposed around each of said flat belts in the direction of movement thereof and slightly apart from said picking combs for guiding said root structure into said picking combs and for guiding the movement of picked peanuts.

2. The harvester as recited in claim 1 which further comprises:
   a vehicle having a chassis;
   means for moving said vehicle forward along said peanut bed;
   a longitudinally oriented elongated framework disposed on said chassis at an acute angle with respect to said peanut bed and having a forward end thereof disposed adjacent to the surface of said peanut bed;
   said pair of belts being disposed in a horizontal plane with respect to said framework and supported by a pair of pulleys at the forward end and a pair of pulleys at the rear end of said framework, said plant conveyor belt having a portion of said pair of belts aligned with a longitudinal central axis of said framework and disposed back to back;
   belt driving means for driving said plant conveyor belt such that said back to back portion moves upward and rearward with such rearward motion having essentially the same velocity as said forward motion of said vehicle causing said back to back portion to engage stem portions of said peanut plants between said pair of belts and to pull said plants vertically upward thereby unearthing said plants from said bed and thereafter carrying unearthed plants rearward and upward; and
   flat belt drive means for moving said picking belts in their respective directions transverse to said plant conveyor belt to cause said picking comb to engage said root structure of said plants and to strip peanuts therefrom.

3. The harvester as recited in claim 2 which further comprises:
   guide bars attached to said forward end of said framework for guiding said plant stems into said plant conveyor belt.

4. The harvester as recited in claim 2 which further comprises a set of plow bars for breaking soil adjacent said peanut plants prior to removal thereof from said bed.

5. The harvester as recited in claim 2 in which each of said picking elements includes:
   said flat belt drive means includes a motor operatively connected to said drums.

6. The harvester as recited in claim 5 in which a first of said picking belts is inclined with respect to the plane of said plant conveyor belt and a second of said picking belts is inclined oppositely to said first picking belt with respect to the plane of said plant conveyor belt.

7. The harvester as recited in claim 2 in which said belt driving means includes means for rotating said rear end pair of pulleys in opposite directions.

8. The harvester as recited in claim 2 in which said belt driving means includes a hydraulic motor.

9. The harvester as recited in claim 2 which further includes a V-shaped guide channel disposed above and essentially parallel to said back to back portion of said plant conveyor belt for isolating a leafy portion of said peanut plants.

10. The harvester as recited in claim 2 which further includes means for shaking said root structure of said plants prior to stripping peanuts therefrom for removing dirt therefrom.

11. The harvester as recited in claim 10 which further includes blower means for assisting said shaking means in removing dirt from said root structure.

12. The harvester as recited in claim 2 which further includes:
    a storage bin mounted on said chassis; and
    conveyor means for conveying stripped peanuts from said picking element to said storage bin for storage therein.

13. The harvester as recited in claim 2 in which said framework includes adjustment means for adjusting the position of said framework with respect to said surface of said peanut bed.

14. Apparatus for harvesting green peanut plants and peanuts from a bed comprising:
    (a) a plant conveyor belt having a pair of continuous belts positioned with portions of said pair back to back, said conveyor belt disposed at an acute angle with respect to the bed and having a forward end thereof adjacent the surface of the bed;

(b) first drive means coupled to said conveyor belt for causing said back to back portions to move rearwardly and upwardly with respect to the surface of the bed;

(c) second drive means for moving said plant conveyor belt forward along the surface of the bed at the approximate velocity of the rearward movement of said back to back belt portions of said conveyor belt for causing said pair of belts to engage stem portions of the peanut plants and to extract the plants from the bed; and (d) a peanut picking means disposed below and adjacent a rearward end of said conveyor belt for picking peanuts from a root structure of such extracted plants, said picking means having
 (i) first and second picking elements disposed in tandem relationship, said first element having a flat belt moving in a first direction transverse to said conveyor belt and said second element having a flat belt moving in the opposite transverse direction,
 (ii) each of said flat belts disposed on a pair of rotatable drums having parallel axes,
 (iii) each of said flat belts having a plurality of sawtooth like picking combs attached to the surface thereof, and
 (iv) a shield disposed around each of said flat belts in the direction of movement thereof and slightly apart from said picking combs for guiding said root structure into said picking combs and for guiding the movement of picked peanuts.

15. The harvester as recited in claim 14 in which a first of said flat belts is inclined with respect to the plane of said plant conveyor belt and a second of said flat belts is inclined oppositely to said first picking belt with respect to the plane of said plant conveyor belt.

16. A harvester for unearthing green peanut plants from a peanut bed and thereafter picking green peanuts from a root structure of said plants comprising:

a vehicle having a chassis;

means for moving said vehicle forward along said peanut bed;

a longitudinally oriented elongated framework disposed on said chassis at an acute angle with respect to said peanut bed and having a forward end thereof disposed adjacent to the surface of said peanut bed;

a continuous plant conveyor belt having a pair of belts disposed in a horizontal plane with respect to said framework and supported by a pair of pulleys at the forward end and a pair of pulleys at the rear end of said framework, said plant conveyor belt having a portion of said pair of belts aligned with a longitudinal central axis of said framework and disposed back to back;

belt driving means for driving said plant conveyor belt such that said back to back portion moves upward and rearward with such rearward motion having essentially the same velocity as said forward motion of said vehicle causing said back to back portion to engage stem portions of said peanut plants between said pair of belts and to pull said plants vertically upward thereby removing said plants from said bed and thereafter carrying removed plants rearward and upward; and a peanut picking means disposed below and adjacent a rearward end of said conveyor belt for picking peanuts from a root structure of such extracted plants, said picking means having
 (i) first and second picking elements disposed in tandem relationship, said first element having a flat belt moving in a first direction transverse to said conveyor belt and said second element having a flat belt moving in the opposite transverse direction,
 (ii) each of said flat belts disposed on a pair of rotatable drums having parallel axes,
 (iii) each of said flat belts having a plurality of sawtooth like picking combs attached to the surface thereof, and
 (iv) a shield disposed around each of said flat belts in the direction of movement thereof and slightly apart from said picking combs for guiding said root structure into said picking combs and for guiding the movement of picked peanuts.

* * * * *